United States Patent Office 3,119,378
Patented Jan. 28, 1964

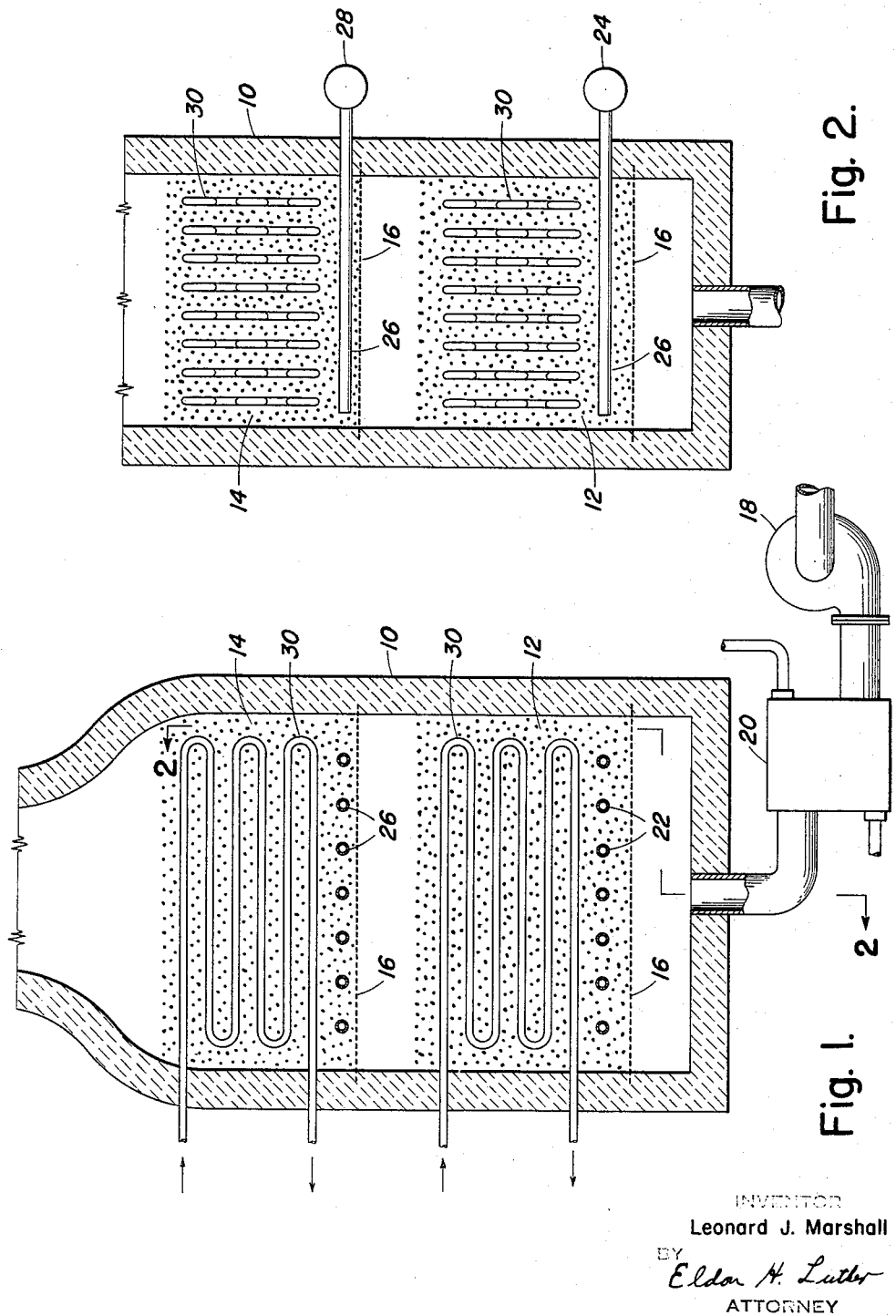

3,119,378
STEAM GENERATION
Leonard J. Marshall, Tenafly, N.J., assignor to Combustion Engineering, Inc., New York, N.Y., a corporation of Delaware
Filed June 26, 1956, Ser. No. 593,985
4 Claims. (Cl. 122—4)

This invention relates to an improved method of generating and/or heating steam or for heating other desired fluids and has particular relation to an improved method for this purpose employing a fluidized bed of discrete material that is comprised, at least in part, of an oxidation catalyst with fuel being introduced and catalytically oxidized in this bed.

A bed of discrete material may be fluidized by passing a stream of gas upwardly therethrough, with fluidization for a particular particle size occurring at or above a predetermined velocity. When in this fluidized state the particles of the material move rather rapidly throughout the body of the material with the entire mass being in an agitated state resembling a boiling liquid and with the violence of the agitation depending upon the velocity of the gas passing upwardly through the material. When in this fluidized state the material is not carried along with the fluidizing gas and although the body of material will be expanded from its packed or nonfluidized condition, the fluidizing gas passes through the material and leaves the same at what is termed a "disengaging zone." With a given particle size the velocity of the gases passing through the material must be maintained within specific minimum and maximum limits in order to have proper fluidization. The maximum limit is that where substantial quantities of the material are carried away by the up flowing gas stream, or in other words, the material becomes entrained within the gas stream, while the minimum limit is that below which fluidization does not occur with the mass of material remaining in the so-called packed condition and the particles not moving from their "at rest" position.

These fluidized beds of material have the inherent properties of providing excellent contact between the upwardly flowing fluidizing gas stream and the particles in the bed and of providing extremely high rates of heat transfer from this gas stream to a heat exchange coil, or the like, immersed within the bed. These properties make it highly advantageous to be able to introduce and burn a fuel directly within such a bed and to absorb heat from the bed for the generation and/or heating of steam or the heating of other fluids.

While oxidation of a fuel within such a bed may be had when the material of the bed is not an oxidation catalyst provided this material is heated to a high temperature where what may be termed, "surface combustion" will take place on the surface of the material, because of the difficulty in heating such a material to the required high temperature it is desirable to employ a bed of material that is, at least in part, an oxidation catalyst. When such is the case the fuel, which may be a gas such as methane, a liquid such as oil or a solid such as pulverized coal, may be introduced directly into the bed along with a combustion supporting gas (generally air) and catalytically oxidized therewithin with the temperature of the bed being within a readily obtainable range. As an example, when methane is employed as a fuel, oxidation may be had in a bed of oxidation catalyst when the bed is at a temperature as low as 600 or 700° F. while with a bed of material that is not an oxidation catalyst the temperature of the bed would need to be in the range of 1800–2000° F. in order to burn this fuel.

The oxidation catalysts to which reference is being made have definite upper and lower temperature limits in between which the catalyst will properly perform its intended function of catalyzing the oxidation process of the fuel with the upper limit being termed the "deactivation" temperature above which the catalyst is permanently destroyed or permanently impaired and the lower limit being termed the "activation" temperature below which the catalyst will not function as a catalyst to catalyze the oxidation process with a good catalyst having an activation temperature of about 600° F. and a deactivation temperature of about 1500° F. The catalysts that are herein contemplated function to catalytically oxidize the fuel without the development of a flame and owe their activity to physical structure and/or chemical constituents which require that they be used under such conditions that these special characteristics will not be destroyed. Examples of oxidation catalysts which are particularly suitable for use in the invention include activated forms of metal oxides impregnated with a minor amount of metal in finely divided form.

In particular, activated forms of alumina, beryllia, thoria, zirconia, or magnesia, or mixtures of these oxides, impregnated with minor amounts of finely divided metals such as platinum, palladium, rhodium, ruthenium, silver, copper, chromium, manganese, nickel, cobalt or combinations of these metals such as silver-chromium, copper-chromium, copper-manganese combination, have been found to be especially suitable. Activated forms of these metal oxides may be prepared by controlled dehydration of a dehydrated form of the oxide of the metal with the activated form of metal oxide thus produced having an extremely high porosity which results in a very large area being impregnated with the finely divided metal.

The activity of the catalyst of course varies in accordance with the characteristic of the metal with which the activated metal oxide is impregnated with certain metals, such as platinum, having an extremely high activity. The amount of metal impregnation that is required also varies with the characteristic of the metal with a greater amount of impregnation being required with metals of decreasing activity in order to produce a catalyst which is of acceptable activity.

While a bed of oxidation catalyst will oxidize a fuel at a much lower temperature than a bed of material which is not an oxidation catalyst, such as the catalyst carrier activated alumina, it is essential that the catalyst not be heated above its deactivation temperature in order to prevent its destruction. When an inflammable mixture of fuel and air is introduced into a fluidized bed of catalyst it has been found that while the temperature of the bed, as a whole may be well below the deactivation temperature of the catalyst intermittent and localized zones wherein flame combustion is produced will be evidenced and since the temperature resulting from flame combustion is generally higher than 3000° F. the catalyst at these locations will be well above the deactivation temperature and accordingly within a period of time all of the catalyst will have been heated above its deactivation temperature and accordingly destroyed. When an inflammable mixture of fuel and air has been introduced into the catalyst it is impossible to prevent this localized flame combustion. However, by regulating the fuel and air mixture so that it is either so lean or so rich that it is outside the range of inflammability, this problem has been overcome while still effecting catalytic oxidation in the bed and by passing the effluent from such a bed through a bed of fluidized material that is not an oxidation catalyst and which is at a temperature of 1800–2000° F. and is capable of effecting surface combustion of the fuel at this temperature the excess air or fuel in this effluent may be utilized.

In accordance with the present invention there is provided a bed of material that is at least in part an oxidation catalyst having a substantial range of operation as for example an activation temperature of 600° F. and a deactivation temperature of 1500° F. Upwardly through this bed of material is passed a gas, preferably air, heated to a suitable temperature sufficient to heat the bed of material to a temperature just above its activation temperature. After thus heating the material fuel is introduced into the lower portion of the bed with the ratio of fuel to air being such that the thus produced mixture is outside the range of inflammability and for the purpose of explanation it will be assured that a rich mixture is supplied to this bed of catalyst although a lean mixture may be employed if desired. Oxidation of sufficient of this fuel will be had in the catalytic bed to completely consume the oxygen in the air passing through the bed and the effluent from this bed, which will contain a substantial quantity of unburned fuel, is passed upwardly through a bed of material which is not an oxidation catalyst. The fuel and air introduced into the catalytic bed is regulated to maintain the bed fluidized and heat it to just below the deactivation temperature of the catalyst, such as 1450° F. in the example mentioned. The effluent from the catalytic bed heats the material of the bed and air is introduced into the lower portion of this second bed in sufficient quantity to supply the necessary oxygen for the oxidation of the unburned fuel in the effluent with this air and the gaseous effluent fluidizing this second bed. While the temperature of the effluent from the catalytic bed may not be sufficient to heat the bed of noncatalytic material to a temperature where complete oxidation of the unburned fuel will be had through surface combustion in this second bed, the temperature of this second bed will be raised by initially incomplete oxidation of this fuel within this bed so that the temperature will be rapidly raised to the temperature of 1800–2000° F. where complete oxidation of the fuel in the effluent will be had.

Heat is absorbed from each of the beds through a heat exchange coil immersed in the bed and through which water may be conveyed and converted to steam or any other desired fluid may be passed with the heat input to the beds and the heat withdrawn from the beds being regulated so the beds are maintained at their required temperature for effecting oxidation of the fuel supplied to them.

It is an object of this invention to provide an improved method of heat release and heat absorption involving the use of a fluidized discrete material that is an oxidation catalyst.

Other and further objects of this invention will be apparent to those skilled in the art as the following detailed description proceeds wherein reference will be had to the accompanying drawing which is a diagrammatic representation of an apparatus for carrying out the improved method of the invention and wherein:

FIG. 1 is a vertical transverse section through this apparatus; and FIG. 2 is a section taken along line 2—2 of FIG. 1.

Referring now to the drawing, wherein like reference characters are used throughout to designate like elements, the organization depicted therein, which may be a steam generator or the like, comprises a housing 10 containing a lower bed of discrete material 12 and an upper bed of discrete material 14 with each of these beds being supported upon a suitable support 16 which may take the form of a screen, perforate plate, or spaced tubular members, and which prevents passage of discrete material downwardly therethrough but permits the upwardly flow of a fluidizing gas.

The lower bed of discrete material is comprised at least in part of an oxidation catalyst while the upper bed 14 is comprised entirely of noncatalytic material. Air is introduced into the bottom of housing 10 and passed upwardly through the beds by means of blower 18 and in order that the bed of material 12 may be raised to its activation temperature, which is preferably between 500 and 900° F., this air is heated sufficiently by means of air heater 20, which may be of any desired form, to accomplish this result. After this bed of material 12 has been heated above its activation temperature in this manner fuel is introduced into the lower portion of this bed through the fuel distribution conduits 22 which extend across the bed and are connected with a suitable supply header 24. The velocity at which the air is passed through bed 12 is regulated so as to fluidize this bed and the ratio of fuel and air is regulated so that the fuel and air mixture within this bed is outside the range of inflammability with this being accomplished either by supplying too much fuel or too little fuel to produce an inflammable mixture. Sufficient fuel is supplied to bed 12 to raise the temperature of the bed to just below the deactivation temperature of the catalyst which is preferably between 1300° F. and 1600° F. Effluent from this bed of catalytic material passes upwardly through the bed of material 14 fluidizing this upper bed and heating it to substantially the temperature of the effluent. This effluent will contain either a substantial quantity of excess air or unburned fuel depending upon whether the mixture introduced into the bed of catalytic material 12 was a lean or rich mixture respectively. If the effluent contains excess air, fuel will be introduced into the lower portion of the bed of material 12 through distribution conduits 26 which extend across this bed and are connected with the supply header 28 with the quantity of fuel being introduced through conduits 26 being regulated so that the resulting mixture of fuel and air will be such as to produce substantially complete combustion of the fuel with the minimum excess air requirement. When the effluent from the catalytic bed 12 contains a substantial quantity of fuel air will be introduced into the lower portion of the bed 14 through conduits 26 for effecting this same result of substantially complete combustion with a minimum excess air requirement.

While the bed of noncatalytic material 14 will be heated to an insufficiently high temperature by means of the effluent from the catalytic bed of material 12 to effect complete combustion of the fuel-air mixture passing through this bed 14 it will be sufficiently high to initially produce partial or incomplete oxidation of this fuel which will, in turn, rapidly raise the temperature of the bed to the required temperature of 1800–2000° F. where complete combustion of the fuel will be had. By employing the catalytic bed it is possible to readily heat the noncatalytic bed to a sufficiently high temperature for this partial oxidation to take place while the catalytic bed need be initially heated to a relatively low temperature at which the noncatalytic bed is completely inoperative.

Heat is absorbed from each of the beds 12 and 14 through heat exchange coils 30 immersed in these beds with these heat exchange coils providing for the generation of steam or the heating of any fluid desired.

The term "air" as used in this application is intended to include all gases or gas mixtures capable of supporting combustion.

Thus in accordance with the method of the present invention flame combustion within the bed of catalytic material is positively prevented by maintaining the fuel-air mixture in this bed outside the range of inflammability while at the same time the inherent advantages thus obtained by the use of an oxidation catalyst is had with complete combustion being provided in a novel manner.

What is claimed is:

1. The method of heating a fluid comprising flowing upwardly a fluidized bed of discrete oxidation catalyst which has an activation and a deactivation temperature with the deactivation temperature being well below flame temperature a fuel-air mixture that is sufficiently rich in fuel so that it is outside the range of inflammability, effecting catalytic oxidation of the fuel within said bed to the extent permitted by the air contained in said mixture while maintaining the temperature of the catalyst below the deactivation temperature, passing the remainder of said fuel and other effluent from said bed upwardly through another fluidized bed of discrete inert material that is unaffected by flame combustion, thereby heating said material substantially to the temperature of said effluent oxidizing sufficient fuel in said bed of catalyst to raise the temperature of said other bed to a sufficiently high value so as to oxidize a fuel-air mixture therein while maintaining the catalyst below its deactivation temperature, introducing sufficient air into this other bed to support combustion of this remaining portion of the fuel, effecting oxidation of said remaining fuel portion in this other bed, and imparting heat from said bed to a fluid by passing a fluid in indirect heat exchange relation with said beds.

2. The improved method comprising providing a bed of a discrete material that is at least in part an oxidation catalyst and is capable of effecting oxidation of a fuel in the presence of air when the material is heated to a certain minimum temperature but not above a certain maximum temperature well below oxidizing flame temperature, heating said material to a temperature within said minimum and maximum temperature and to where it is capable of oxidizing a mixture of fuel and air of such proportions that the mixture is outside the range of inflammability, fluidizing said bed of catalyst at least in part by passing such a fuel air mixture upwardly through said bed and oxidizing this fuel within the bed so that the one constituent of the mixture that is below the percentage required for flame combustion is substantially entirely consumed in the process with the excess of the other constituent passing from the bed, providing a second bed of discrete material that is capable of effecting oxidation of a combustible fuel-air mixture when the material is heated to a minimum tempertaure well above the required minimum temperature of the first mentioned material with this second bed of material being unaffected by flame combustion therewithin, passing the effluent from the first bed upwardly through the second bed of material and oxidizing sufficient fuel in said first bed to raise the temperature of the second bed above its required minimum, maintaining the second bed fluidized and at a temperature above its required minimum, supplying to this bed with said one constituent of the fuel-air mixture in such quantity as to produce with said other constituent a combustible mixture, substantially completely oxidizing the fuel in said mixture within said second bed and heating a fluid by passing it in direct heat exchange relation with said beds.

3. The improved method comprising providing a bed of a discrete material that is at least in part an oxidation catalyst and is capable of effecting oxidation of a fuel in the presence of air when the material is heated to a certain minimum tempertaure but not above a certain maximum temperature well below oxidizing flame temperature, heating said material to a temperature within said minimum and maximum temperatures and to where it is capable of oxidizing a mixture of fuel and air of such proportions that the mixture is outside the range of inflammability, fluidizing said bed of catalyst at least in part by passing a fuel-air mixture so rich as to be outside the range of inflammability upwardly through said bed and oxidizing as much of the fuel in this mixture as is permitted by the air present with the excess fuel passing from the bed, providing a second bed of discrete material that is capable of effecting oxidation of a combustible fuel-air mixture when the material is heated to a minimum temperature well above the required minimum temperature of the first mentioned material with this second bed of material being unaffected by flame combustion therewithin, passing the effluent from the first bed upwardly through the second bed of material, oxidizing sufficient fuel in the catalytic bed to heat the second bed to said minimum temperature, maintaining the second bed fluidized and supplying this bed with sufficient air to produce with this fuel in the effluent a combustible mixture, substantially completely oxidizing the fuel in said mixture within said second bed and heating a fluid by passing it in indirect heat exchange relation with said beds.

4. The improved method comprising, providing a bed of a discrete material that is at least in part an oxidation catalyst and is capable of effecting oxidation of a fuel in the presence of air when the material is heated to a certain minimum temperature but not above a certain maximum temperature well below oxidizing flame temperature, heating said material to a temperature within said minimum and maximum temperatures and to where it is capable of oxidizing a mixture of fuel and air of such proportions that the mixture is outside the range of inflammability, fluidizing said bed of catalyst at least in part by passing a fuel-air mixture so lean as to be outside the range of inflammability upwardly through said bed and oxidizing this fuel within the bed with the excess air passing from the bed, providing a second bed of discrete material that is capable of effecting oxidation of a combustible fuel-air mixture when the material is heated to a minimum temperature well above the required minimum temperature of the first mentioned material with this second bed of material being unaffected by flame combustion therewithin, passing the effluent from the first bed upwardly through the second bed of material, oxidizing sufficient fuel in the catalytic bed to heat the second bed to said minimum temperature, maintaining the second bed fluidized and supplying to this bed sufficient fuel to produce with said excess air in the effluent a combustible mixture, substantially completely oxidizing the fuel in said mixture within said second bed and heating a fluid by passing it in indirect heat exchange relation with said beds.

References Cited in the file of this patent

UNITED STATES PATENTS

| | | |
|---|---|---|
| 2,121,733 | Cottrell | June 21, 1938 |
| 2,665,971 | Lewis, et al. | Jan. 12, 1954 |
| 2,729,428 | Milmore | Jan. 3, 1956 |
| 2,997,031 | Ulmer | Aug. 22, 1961 |

OTHER REFERENCES

Haslam and Russell: Fuels and Their Combustion, McGraw-Hill Book Co., New York, 1926, pages 304–310.

UNITED STATES PATENT OFFICE
CERTIFICATE OF CORRECTION

Patent No. 3,119,378              January 28, 1964

Leonard J. Marshall

It is hereby certified that error appears in the above numbered patent requiring correction and that the said Letters Patent should read as corrected below.

Column 2, line 29, for "dehydrated" read -- hydrated --; column 3, line 11, for "assured" read -- assumed --; column 4, line 68, after "upwardly" insert -- through --; line 71, after "temperature" insert a comma; column 5, line 48, for "direct" read -- indirect --.

Signed and sealed this 20th day of October 1964.

(SEAL)
Attest:

ERNEST W. SWIDER
Attesting Officer

EDWARD J. BRENNER
Commissioner of Patents